(12) United States Patent
Portman

(10) Patent No.: US 10,145,461 B2
(45) Date of Patent: Dec. 4, 2018

(54) DISCONNECTING POWER TAKE-OFF WITH INPUT SHAFT HAVING PRESSED-ON SEAL JOURNAL

(71) Applicant: American Axle & Manufacturing, Inc., Detroit, MI (US)

(72) Inventor: Aaron C. Portman, Canton, MI (US)

(73) Assignee: AMERICAN AXLE & MANUFACTURING, INC., Detroit, MI (US)

(*) Notice: Subject to any disclaimer, the term of this patent is extended or adjusted under 35 U.S.C. 154(b) by 0 days.

(21) Appl. No.: 15/872,087

(22) Filed: Jan. 16, 2018

(65) Prior Publication Data

US 2018/0216721 A1 Aug. 2, 2018

Related U.S. Application Data

(60) Provisional application No. 62/453,031, filed on Feb. 1, 2017.

(51) Int. Cl.
*F16H 57/029* (2012.01)
*B60K 17/28* (2006.01)
(Continued)

(52) U.S. Cl.
CPC .......... *F16H 57/029* (2013.01); *B60K 17/28* (2013.01); *F16C 19/364* (2013.01);
(Continued)

(58) Field of Classification Search
CPC ............... F16H 57/029; F16H 57/021; F16H 2057/02082; F16D 11/14; F16C 19/364; F16J 15/16; B60K 17/28
See application file for complete search history.

(56) References Cited

U.S. PATENT DOCUMENTS 2,630,872 A * 3/1953 Roos .................. B60K 17/28
180/53.1
3,002,393 A * 10/1961 Browning .............. B60K 17/28
74/11
(Continued)

FOREIGN PATENT DOCUMENTS

JP H06191300 A 7/1994
JP 3294650 B2 6/2002

OTHER PUBLICATIONS

PCT International Search Report dated May 8, 2018 for corresponding PCT application No. PCT/US2018/015184, filed Jan. 25, 2018.

*Primary Examiner* — Darlene P Condra
(74) *Attorney, Agent, or Firm* — Harness, Dickey & Pierce, P.L.C.

(57) ABSTRACT

A disconnecting power take-off unit having a housing, an input shaft, a gear shaft, a seal journal and a dynamic seal. The input shaft is rotatably disposed in the housing and includes a plurality of splines or teeth. The gear shaft is disposed about the input shaft and is supported on an end by a gear shaft bearing having an inner bearing race. The seal journal is received over the splines or teeth and is fixedly and sealingly engaged to the input shaft. The seal journal has an exterior seal surface that can be sized larger in diameter than the splines or teeth on the input shaft and/or the inside diameter of the inner bearing race of the gear shaft bearing. The dynamic seal is received over the spline teeth and is sealingly engaged to the housing and the exterior seal surface.

15 Claims, 2 Drawing Sheets

Figure 1:
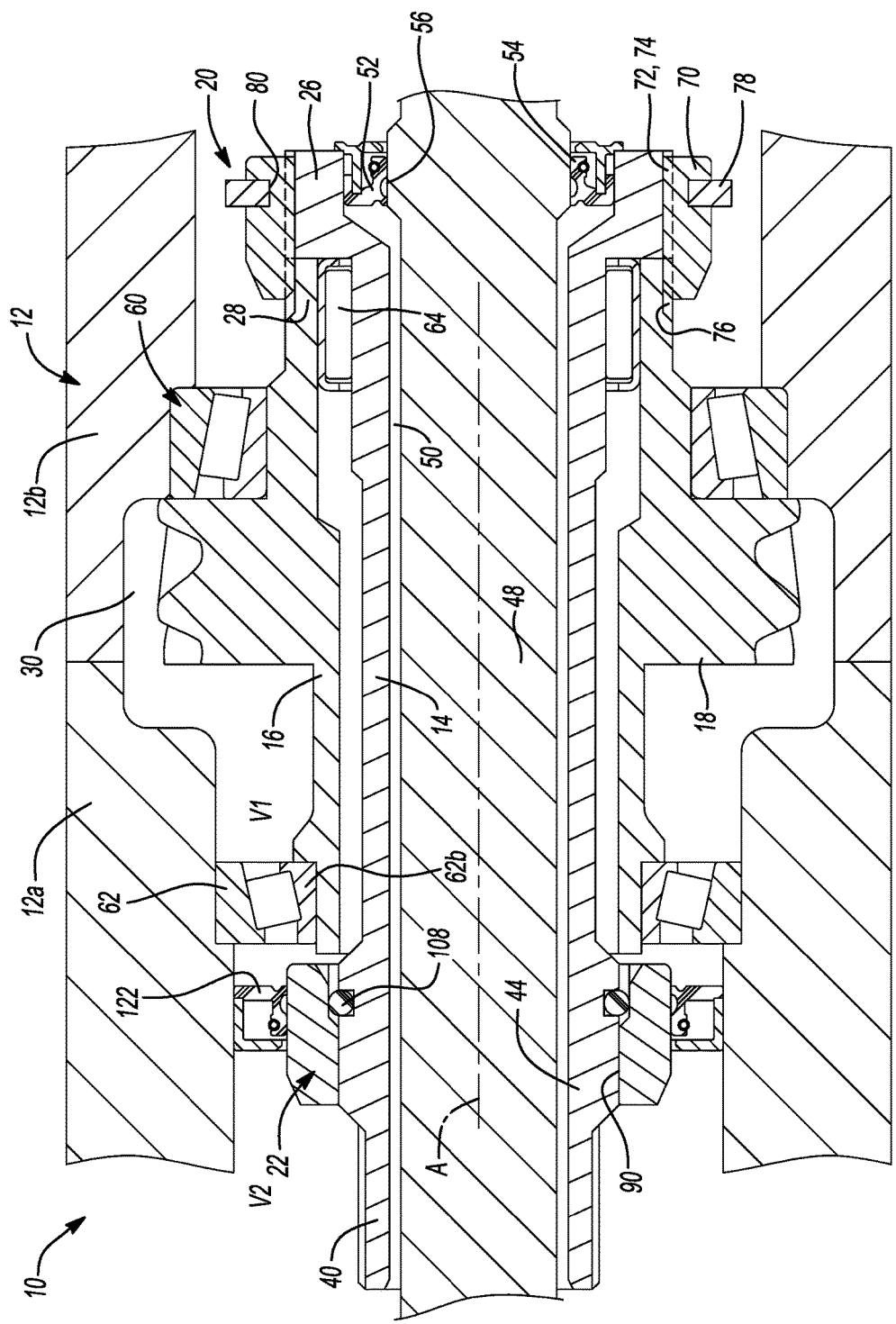

(51) Int. Cl.
*F16H 57/021* (2012.01)
*F16J 15/16* (2006.01)
*F16C 19/36* (2006.01)
*F16L 11/14* (2006.01)
*F16H 57/02* (2012.01)

(52) U.S. Cl.
CPC ............ *F16H 57/021* (2013.01); *F16J 15/16* (2013.01); *F16L 11/14* (2013.01); *F16H 2057/02082* (2013.01)

(56) References Cited

U.S. PATENT DOCUMENTS

| | | | |
|---|---|---|---|
| 3,540,297 A * | 11/1970 | Wagner | B60K 17/28 |
| | | | 74/15.86 |
| 6,497,313 B1 * | 12/2002 | Blalock | B60K 17/28 |
| | | | 192/18 A |
| 2003/0183474 A1 | 10/2003 | Heidenreich et al. | |
| 2012/0285276 A1 | 11/2012 | Niimura | |
| 2013/0303323 A1 | 11/2013 | Zink et al. | |
| 2013/0303324 A1 | 11/2013 | Valente et al. | |
| 2013/0305877 A1 | 11/2013 | Brooks | |
| 2013/0310209 A1 | 11/2013 | Downs et al. | |
| 2013/0337960 A1 | 12/2013 | Valente et al. | |
| 2014/0080655 A1 | 3/2014 | Downs et al. | |
| 2014/0213406 A1 | 7/2014 | Downs et al. | |
| 2014/0251080 A1 | 9/2014 | McGuire et al. | |
| 2015/0011349 A1 | 1/2015 | Downs et al. | |
| 2015/0165899 A1 | 6/2015 | Valente et al. | |
| 2015/0266374 A1 | 9/2015 | Downs et al. | |
| 2015/0298543 A1 | 10/2015 | Downs et al. | |
| 2015/0298544 A1 | 10/2015 | Amerla et al. | |
| 2016/0109013 A1 | 4/2016 | Li | |
| 2016/0230816 A1 | 8/2016 | DeGowske et al. | |
| 2017/0043663 A1 | 2/2017 | Downs | |
| 2017/0057352 A1 | 3/2017 | Marsh et al. | |
| 2017/0144539 A1 | 5/2017 | Kincaid et al. | |
| 2017/0144540 A1 | 5/2017 | Kincaid et al. | |
| 2017/0144541 A1 | 5/2017 | Kincaid et al. | |
| 2017/0166050 A1 | 6/2017 | Zink | |
| 2017/0361705 A1 * | 12/2017 | Burrell | B60K 17/28 |

* cited by examiner

DISCONNECTING POWER TAKE-OFF WITH INPUT SHAFT HAVING PRESSED-ON SEAL JOURNAL

CROSS-REFERENCE TO RELATED APPLICATIONS

This application claims the benefit of U.S. Provisional Application No. 62/453,031, filed on Feb. 1, 2017, the entire disclosure of which is incorporated by reference as if fully set forth in detail herein.

FIELD

The present disclosure relates to a disconnecting power take-off with an input shaft having a pressed-on seal journal.

BACKGROUND

This section provides background information related to the present disclosure which is not necessarily prior art.

It is increasingly common for a vehicle to have an all-wheel driveline with a disconnecting power take-off that permits the vehicle driveline to be operated in a front wheel drive mode and an all-wheel drive mode. In some situations the disconnecting power take-off shares a common lubricating fluid with the front transaxle. In situations where the lubricating fluid in the disconnecting power take-off is to be segregated from the lubricating fluid of the front transaxle, several dynamic seals can be included in the power take-off unit to provide the desired level of sealing. While this solution can be effective, we note that the use of multiple dynamic seals can disadvantageous due to the increase in drag force that results when additional dynamic seals are incorporated into a power take-off unit.

SUMMARY

This section provides a general summary of the disclosure, and is not a comprehensive disclosure of its full scope or all of its features.

In one form, the present teachings provide a disconnecting power take-off unit that includes a housing, a gear shaft, a gear, a gear shaft bearing, an input shaft, a seal journal and a dynamic seal. The gear shaft is received in the housing and has a coupling output member. The gear is coupled to the gear shaft for rotation therewith. The gear shaft bearing supports the gear shaft for rotation relative to the housing about an axis. The input shaft is rotatable about the axis and is received through the gear shaft. The input shaft has a splined segment, an input coupling member, and a mount that is disposed along the axis between the splined segment and the input coupling member. The splined segment is configured to be drivingly coupled to a mating splined segment on a differential case. The input coupling member is configured to be drivlingly coupled to the output coupling member to permit rotary power to be transmitted from the input shaft to the gear shaft. The mount has an external surface. The seal journal is coupled to the mount for rotation with the input shaft. The seal journal has an input shaft bore and a cylindrically extending seal surface. The input shaft bore has an inner diametrical surface that is engaged to the external surface. The dynamic seal is mounted to the housing and sealingly engages the cylindrically extending seal surface. The dynamic seal is disposed along the axis on a side of the gear shaft bearing opposite the gear.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
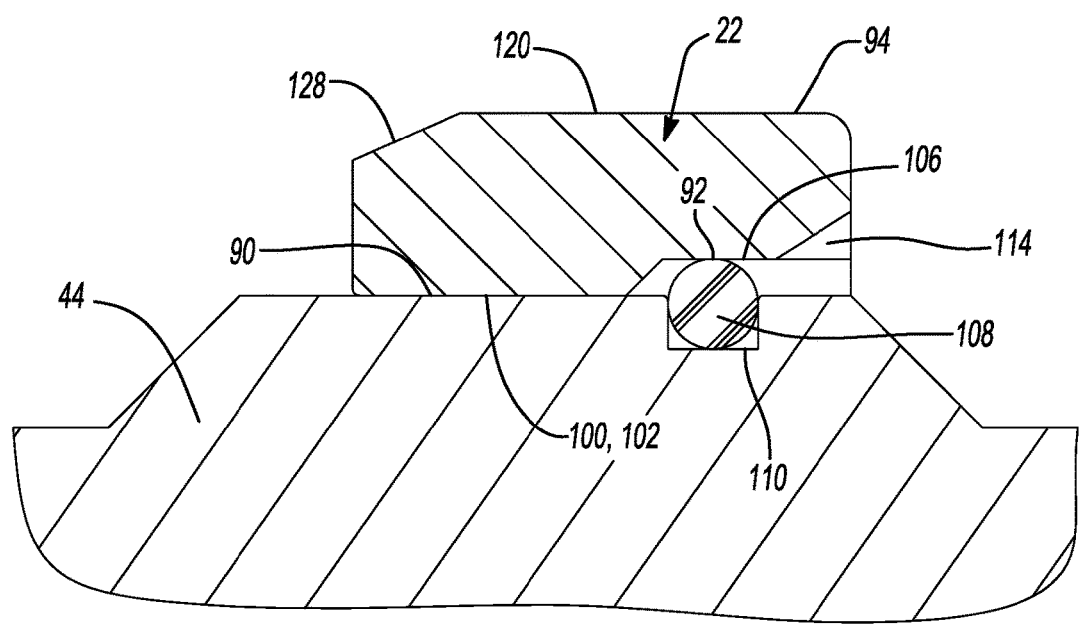

FIG. 1 is a cross-sectional view of a portion of an exemplary power take-off unit constructed in accordance with the teachings of the present disclosure; and FIG. 2 is an enlarged section of FIG. 1 illustrating a seal journal in greater detail.

Corresponding reference numerals indicate corresponding parts throughout the several views of the drawings.

DETAILED DESCRIPTION

With reference to FIG. 1 of the drawings, a portion of an exemplary disconnecting power take-off unit (PTU) 10 constructed in accordance with the teachings of the present disclosure is shown. The PTU 10 can include a housing 12, an input shaft 14, an gear shaft 16, a gear 18, a coupling 20 and a seal journal 22. The coupling 20 is configured for selectively coupling the gear shaft 16 to the input shaft 14 for common rotation about a central axis A and can include a coupling input member 26 and a coupling output member 28.

The housing 12 can define a cavity 30 into which input shaft 14, the gear shaft 16, the gear 18 and the coupling 20 can be received. In the example provided, the housing 12 includes first and second housing members 12a and 12b, respectively, that are joined to one another to form the housing 12. It will be appreciated that a gasket (not shown) could be disposed between the first and second housing members 12a and 12b and that the gasket could be a discretely formed component that is assembled to the first and second housing members 12a and 12b or could be formed of a curable sealing material that can be disposed between the first and second housing members 12a and 12b prior to their assembly to one another.

The input shaft 14 can be coupled to a source of rotary power, such as a differential case (not shown) that can be associated with a differential assembly (not shown) that is employed to drive a pair of front vehicle wheels (not shown). The input shaft 14 can be a hollow structure and can include a splined segment 40, the coupling input member 26 and a mount 44 that can be disposed along the central axis A between the splined segment 40 and the coupling input member 26. The splined segment 40 can be a male splined segment that can be formed on a first axial end of the input shaft 14. The splined segment 40 can be matingly engaged to a corresponding (e.g., female) splined segment (not shown) formed on the differential case. The coupling input member 26 can be fixedly coupled to a second end of the input shaft 14 opposite the splined segment 40. An intermediate drive shaft 48, which can be coupled for rotation with an output (not shown) of the differential assembly, can be received through the hollow interior 50 of the input shaft 14 and can be drivingly coupled to an associated one of the front vehicle wheels. A first dynamic seal 52 can be received into the hollow interior 50 of the input shaft 14 and can be fixedly and sealingly engaged to the input shaft 14. A seal lip 54 formed on the dynamic seal 52 can be sealingly engaged to a cylindrical seal surface 56 that is formed on the intermediate drive shaft 48.

The gear shaft 16 can be a hollow structure that can be received concentrically about the input shaft 14. First and second tapered roller bearings 60 and 62 can be mounted to the gear shaft 16 and the housing 12 to support the gear shaft 16 for rotation about the central axis A relative to the housing 12. In the example provided, the first tapered roller bearing 60 is disposed in the first housing member 12a and the second tapered roller bearing 62 is disposed in the second housing member 12b so that the gear 18 is disposed along the axis A between the first and second tapered roller bearings 60 and 62. One or more bearings, which could comprise a needle bearing 64, can be received radially between the gear shaft 16 and the input shaft 14 to support the input shaft 14 for rotation about the central axis A. The coupling output member 28 can be coupled to the gear shaft 16 for common rotation.

The gear 18 can be a type of bevel ring gear (e.g., spiral bevel gear or hypoid gear) that can be employed in a transmission path between the gear shaft 16 and an output pinion (not shown) of the PTU 10. An example of this configuration is depicted in U.S. Pat. No. 8,469,854. In the example provided, the gear 18 is a helical gear that is configured to transmit rotary power to a mating helical gear (not shown) that is disposed for rotation about an axis (not shown) that is parallel to the central axis A. An example of this configuration is depicted in U.S. Pat. No. 8,047,323.

The coupling 20 can be any type of device that can be configured to selectively transmit rotary power between the coupling input member 26 and the coupling output member 28. For example, the coupling 20 could comprise a type of clutch, such as a multi-plate friction clutch or a dog clutch. In the example provided, however, the coupling 20 comprises a sleeve 70 having internal teeth 72 that are configured to matingly engage external teeth 74 formed on the coupling input member 26 and external teeth 76 formed on the coupling output member 28. In the example provided, an inner bearing race 62a of the second tapered roller bearing 62 has an inside diameter that is sized smaller in diameter than an outer diameter of the coupling input portion 26 and an outer diameter of the coupling output portion 28. As such, the input shaft 14 is not able to slide completely through the gear shaft 14. The sleeve 70 is movable axially along the central axis A between a first position (not shown), in which the internal teeth 72 on the sleeve 70 are disengaged from external teeth 74 on the coupling input member 26 or the external teeth 76 on the coupling output member 28, and a second position (shown) in which the internal teeth 72 on the sleeve 70 are engaged with both the external teeth 74 on the coupling input member 26 and the external teeth 76 on the coupling output member 28. Various types of actuators (not shown) can be employed to translate the sleeve 70 between the first and second positions, such as a conventional clutch fork actuator having a clutch fork 78 that engages a circumferential groove 80 formed in the sleeve 70.

With reference to FIGS. 1 and 2, the seal journal 22 can be a hollow sleeve-like structure that can define an input shaft bore 90, an inner seal bore 92, and an outer seal journal 94. The input shaft bore 90 can define a diametrical surface 100 that is configured to engage an external surface 102 of the mount 44 on the input shaft 14 with a desired fit, such as a press-fit, so that the seal journal 22 is coupled to the input shaft 14 for rotation therewith and is precisely aligned to the central axis A. The inner seal bore 92 can define a circumferentially-extending seal surface 106 that can be configured to sealingly engage a suitable static seal member, such as an O-ring 108, that can also sealingly engage the mount 44 to inhibit fluid communication radially between the mount 44 and the seal journal 22. The O-ring 108 can be received into a circumferentially extending groove 110 formed in the mount 44. The inner seal bore 92 can include a frusto-conical lead-in portion 114 that can help to compress the O-ring 108 when the seal journal 22 is pushed (from left to right in the figure) over the O-ring 108 and into engagement with the external surface 102 on the mount 44. The outer seal journal 22 can define a cylindrically extending seal surface 120 that is configured to sealingly engage a second dynamic seal 122 that is sealingly engaged to the housing 12. The second dynamic seal 122 inhibits fluid communication radially between the seal journal 22 and the housing 12. In the example provided, the seal journal 22 is installed to the input shaft 14 prior to the assembly of the second dynamic seal 122 to the housing 12. Accordingly, a lead-in chamfer 128 is formed on the seal journal 22 and is configured to guide the second dynamic seal 122 and expand the second dynamic seal 122 as it is pushed onto the seal journal 22. The lead-in chamfer 128 can intersect the cylindrically extending seal surface 120 on a side that is opposite the second tapered roller bearing 62.

The cylindrically extending seal surface 120 is sized larger than the splines on the splined segment 40 by an amount that provides clearance between the teeth of the splined segment and the second dynamic seal 52. Additionally, the cylindrically extending seal surface 120 can be larger in diameter than an inside diameter of the gear shaft 16 so that the seal journal 22 cannot pass through the gear shaft 16.

The first and second dynamic seals 52 and 122 and the O-ring seal 108 segregate a lubricating fluid in the housing 12 of the PTU 10 into a first volume V1 that is separate and distinct from a second volume V2 in which the lubricant for the differential assembly is contained. In the example provided, the lubricant in each of the first and second volumes V1 and V2 is an automatic transmission fluid, but it will be appreciated that different lubricants could be contained in the first and second volumes V1 and V2 in the alternative.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A disconnecting power take-off unit comprising:
a housing;
a gear shaft received in the housing, the gear shaft having a coupling output member;
a gear coupled to the gear shaft for rotation therewith;
a gear shaft bearing supporting the gear shaft for rotation relative to the housing about an axis;
an input shaft that is rotatable about the axis and which is received through the gear shaft, the input shaft having a splined segment, a coupling input member, and a mount that is disposed along the axis between the splined segment and the coupling input member, the splined segment being adapted to be drivingly coupled to a mating splined segment on a differential case, the coupling input member being adapted to be drivingly coupled to the coupling output member to permit rotary power to be transmitted from the input shaft to the gear shaft, the mount having an external surface;

a seal journal coupled to the mount for rotation with the input shaft, the seal journal having an input shaft bore and a cylindrically extending seal surface, the input shaft bore having an inner diametrical surface that is engaged to the external surface; and a dynamic seal mounted to the housing and sealingly engaging the cylindrically extending seal surface, wherein the dynamic seal is disposed along the axis on a side of the gear shaft bearing opposite the gear.

2. The disconnecting power take-off unit of claim 1, further comprising a coupling that is selectively operable to decouple the coupling input member and the coupling output member from one another.

3. The disconnecting power take-off unit of claim 2, wherein the coupling comprises a sleeve having internal teeth that are configured to matingly engage external teeth formed on the coupling input member and external teeth formed on the coupling output member.

4. The disconnecting power take-off unit of claim 3, wherein the gear shaft bearing has an inner bearing race that is smaller in diameter than the coupling input member.

5. The disconnecting power take-off unit of claim 1, wherein the gear shaft bearing has an inner bearing race that is smaller in diameter than the cylindrically extending seal surface of the seal journal.

6. The disconnecting power take-off unit of claim 1, wherein the gear is a helical gear.

7. The disconnecting power take-off unit of claim 1, further comprising a static seal member disposed between the seal journal and the mount.

8. The disconnecting power take-off unit of claim 7, wherein one of the seal journal and the mount defines a groove for retaining the static seal member.

9. The disconnecting power take-off unit of claim 7, wherein the static seal member is an O-ring.

10. The disconnecting power take-off unit of claim 1, wherein the inner diametrical surface that is engaged to the external surface in a press-fit manner.

11. The disconnecting power take-off unit of claim 1, wherein a lead-in chamfer is formed onto the seal journal, the lead-in chamfer intersecting the cylindrically extending seal surface on a side of the cylindrically extending seal surface that is opposite the gear shaft bearing.

12. The disconnecting power take-off unit of claim 1, further comprising another gear shaft bearing disposed between the housing and the gear shaft.

13. The disconnecting power take-off unit of claim 12, wherein the gear is disposed along the axis between the gear shaft bearing and the another gear shaft bearing.

14. The disconnecting power take-off unit of claim 13, wherein the housing comprises a first housing member and a second housing member that are joined to one another along the axis between the gear shaft bearing and the another gear shaft bearing.

15. The disconnecting power take-off unit of claim 1, wherein a needle bearing is disposed between the input shaft and the gear shaft.

* * * * *